(12) United States Patent
Tarkiainen et al.

(10) Patent No.: US 11,146,194 B2
(45) Date of Patent: *Oct. 12, 2021

(54) ELECTROMECHANICAL POWER TRANSMISSION CHAIN, AND AN ELECTRIC SYSTEM, A METHOD AND A COMPUTER PROGRAM FOR CONTROLLING THE SAME TO STABILIZE DC INPUT VOLTAGE OF A CONVERTER DRIVING AN ELECTRIC MACHINE AND DETERMINING A TORQUE REFERENCE OF THE ELECTRIC MACHINE

(71) Applicant: Danfoss Editron Oy, Lappeenranta (FI)

(72) Inventors: Antti Tarkiainen, Lappeenranta (FI); Antti Summanen, Lappeenranta (FI)

(73) Assignee: DANFOSS EDITRON OY, Lappeenranta (FI)

( * ) Notice: Subject to any disclaimer, the term of this patent is extended or adjusted under 35 U.S.C. 154(b) by 0 days.

This patent is subject to a terminal disclaimer.

(21) Appl. No.: 16/793,229

(22) Filed: Feb. 18, 2020

(65) Prior Publication Data
US 2020/0186068 A1 Jun. 11, 2020

Related U.S. Application Data

(63) Continuation of application No. 15/844,691, filed on Dec. 18, 2017, now Pat. No. 10,630,216.

(30) Foreign Application Priority Data
Dec. 21, 2016 (EP) ..................................... 16205805

(51) Int. Cl.
*H02P 9/00* (2006.01)
*H02P 17/00* (2006.01)
(Continued)

(52) U.S. Cl.
CPC .............. *H02P 17/00* (2013.01); *B60L 50/13* (2019.02); *B60L 50/15* (2019.02); *B60L 50/16* (2019.02);
(Continued)

(58) Field of Classification Search
CPC .......... B60L 50/13; B60L 50/15; B60L 50/16; H02M 3/04; H02P 9/00; H02P 17/00; H02P 2205/03; H02P 27/00; Y10S 903/903
See application file for complete search history.

(56) References Cited

U.S. PATENT DOCUMENTS 6,380,715 B1 4/2002 Kubo
9,365,117 B2 6/2016 Rauma et al.
(Continued)

FOREIGN PATENT DOCUMENTS

CN 103684004 A 3/2014
CN 103909835 A 7/2014
(Continued)

OTHER PUBLICATIONS

EP Search Report, dated May 24, 2017, from corresponding EP 16 20 5805 application.

*Primary Examiner* — Tulsidas C Patel
*Assistant Examiner* — S. Mikailoff
(74) *Attorney, Agent, or Firm* — Nixon & Vanderhye

(57) ABSTRACT

An electric system of an electromechanical power transmission chain is provided that includes a first capacitive circuit, converter equipment between the first capacitive circuit and an electric machine, a second capacitive circuit, and a direct voltage converter between the first and second capacitive circuits. The electromechanical power transmission chain is a parallel transmission chain where the electric machine is mechanically connected to a combustion engine and to one (Continued)

or more actuators. The electric system includes a control system for controlling the direct voltage converter in response to changes in a first direct voltage of the first capacitive circuit and for controlling the converter equipment in response to changes in a second direct voltage of the second capacitive circuit. The first direct voltage is kept on a predetermined voltage range whereas the second direct voltage is allowed to fluctuate in order to respond to peak power needs.

12 Claims, 4 Drawing Sheets

(51) Int. Cl.
*H02M 3/04* (2006.01)
*H02P 27/00* (2006.01)
*B60L 50/13* (2019.01)
*B60L 50/16* (2019.01)
*B60L 50/15* (2019.01)

(52) U.S. Cl.
CPC ............... *H02M 3/04* (2013.01); *H02P 9/00* (2013.01); *H02P 27/00* (2013.01); *H02P 2205/03* (2013.01); *Y10S 903/903* (2013.01)

(56) References Cited

U.S. PATENT DOCUMENTS

| | | |
|---|---|---|
| 9,475,397 B2 | 10/2016 | Tarkiainen |
| 9,685,276 B2 | 6/2017 | Jarvelainen |
| 9,708,794 B2 | 7/2017 | Rauma et al. |
| 9,802,559 B2 | 10/2017 | Naumanen et al. |
| 9,944,272 B2 | 4/2018 | Rauma et al. |
| 10,630,216 B2 * | 4/2020 | Tarkiainen .............. B60L 50/16 |
| 2014/0163804 A1 | 6/2014 | Kaneko et al. |
| 2014/0195085 A1 | 7/2014 | Rauma et al. |
| 2015/0194273 A1 | 7/2015 | Jarvelainen |
| 2015/0210169 A1 | 7/2015 | Tarkiainen |
| 2015/0352961 A1 | 12/2015 | Kim et al. |
| 2018/0156107 A1 | 6/2018 | Naumanen et al. |
| 2018/0175763 A1 | 6/2018 | Tarkiainen et al. |
| 2020/0186068 A1 * | 6/2020 | Tarkiainen .............. B60L 50/13 |

FOREIGN PATENT DOCUMENTS

| | | |
|---|---|---|
| CN | 104995357 A | 10/2015 |
| EP | 2096747 A2 | 9/2009 |
| EP | 2602926 A1 | 6/2013 |
| EP | 2949821 A1 | 12/2015 |
| JP | 2002242234 A | 8/2002 |

* cited by examiner

ELECTROMECHANICAL POWER TRANSMISSION CHAIN, AND AN ELECTRIC SYSTEM, A METHOD AND A COMPUTER PROGRAM FOR CONTROLLING THE SAME TO STABILIZE DC INPUT VOLTAGE OF A CONVERTER DRIVING AN ELECTRIC MACHINE AND DETERMINING A TORQUE REFERENCE OF THE ELECTRIC MACHINE

CROSS-REFERENCE TO RELATED APPLICATIONS

This application is a continuation of application Ser. No. 15/844,691, filed Dec. 18, 2017, claiming the benefit of EP16205805.1, filed Dec. 21, 2016.

FIELD OF THE DISCLOSURE

The disclosure relates to an electric system suitable for being a part of an electromechanical power transmission chain. Furthermore, the disclosure relates to a method and to a computer program for controlling an electromechanical power transmission chain.

BACKGROUND

An electromechanical power transmission chain for driving an actuator, e.g. a wheel or a chain track, comprises typically a capacitive circuit, one or more electric machines, and converter equipment for transferring electric energy between the capacitive circuit and the one or more electric machines. The electromechanical power transmission chain can be a series transmission chain where at least one of the electrical machines operates as a generator and the converter equipment comprises one or more converter stages for transferring electric energy from each generator to the capacitive circuit and one or more other converter stages for transferring electric energy from the capacitive circuit to each electric machine which acts as an electric motor for driving an actuator. Each generator can be e.g. an electrically excited synchronous generator or a permanent magnet synchronous generator and the converter stage between the generator and the capacitive circuit can be for example a pulse width modulation "PWM" converter stage. Each electric motor can be e.g. a permanent magnet or induction motor and the converter stage between the capacitive circuit and the electric motor can be e.g. a PWM-converter stage. Each generator can be driven with a combustion engine that can be e.g. a diesel engine, an Otto-cycle engine, or a turbine engine.

An electromechanical power transmission chain can be as well a parallel transmission chain where an electric machine is mechanically connected to a combustion engine and also to an actuator. The electric machine operates sometimes as a generator which charges the capacitive circuit and/or another energy-storage of the electromechanical power transmission chain, and sometimes as an electric motor that receives electric energy from the capacitive circuit and/or the other energy-storage and assists the combustion engine when high mechanical output power is needed. It is also possible that an electromechanical power transmission chain is a combined series-parallel transmission chain so that one or more electric machines are mechanically connected to both a combustion engine and an actuator and one more other electrical machines are arranged to drive one or more other actuators in the same way as in a series transmission chain.

Electromechanical power transmission chains of the kind mentioned above provide advantages compared to a traditional mechanical power transmission chain because, for example, the rotational speed-torque operating point of the combustion engine can be more freely selected from the viewpoint of the operational efficiency of the combustion engine, and thus savings in the fuel costs can be achieved. In many cases, this advantage is achieved so that the above-mentioned capacitive circuit is charged when only low mechanical output power is needed and discharged when high mechanical output power is needed. In other words, the capacitive circuit is used as an energy buffer. The use of the capacitive circuit as an energy buffer is, however, not free from challenges. The electrical energy stored by the capacitive circuit is directly proportional to the square of the voltage of the capacitive circuit, and thus the direct voltage of the capacitive circuit varies when the capacitive circuit acts as an energy buffer. The variation of the direct voltage complicates the control of the electric machines of the electromechanical power transmission chain. Furthermore, in situations where the above-mentioned direct voltage is low, the magnetic fluxes in the electric machines can be so small that the operating efficiencies and maximum torques of the electric machines are decreased.

SUMMARY

The following presents a simplified summary in order to provide a basic understanding of some aspects of various invention embodiments. The summary is not an extensive overview of the invention. It is neither intended to identify key or critical elements of the invention nor to delineate the scope of the invention. The following summary merely presents some concepts of the invention in a simplified form as a prelude to a more detailed description of exemplifying embodiments of the invention.

In accordance with the invention, there is provided a new electric system that is suitable for being a part of an electromechanical power transmission chain that is a parallel transmission chain.

An electric system according to the invention comprises:
a first capacitive circuit comprising at least one first capacitor,
converter equipment for transferring electric power between the first capacitive circuit and an electric machine, the converter equipment being configured to convert a first direct voltage of the first capacitive circuit into an output voltage and to output the output voltage to the electric machine,
a second capacitive circuit comprising at least one second capacitor,
a direct voltage converter for transferring electric energy between the first and the second capacitive circuits, and
a control system for controlling the direct voltage converter in response to changes of the first direct voltage to drive the first direct voltage to a first direct voltage reference value, and for controlling the converter equipment in response to changes of a second direct voltage of the second capacitive circuit to drive the second direct voltage to a second direct voltage reference value,
wherein:
the control system is configured to keep fluctuations of the first direct voltage smaller than fluctuations of the second direct voltage when controlling the direct voltage converter and the converter equipment in response to fluctuation of the electric power transferred between the first capacitive circuit and the electric machine, the converter equipment comprises a converter stage for transferring electric energy from the electric machine to the first capacitive circuit when the electric machine operates as a generator, and for transferring electric energy from the first capacitive circuit to the electric machine when the electric machine operates as an electric motor, and the control system is configured to determine a torque reference for the electric machine at least partly based on: the second direct voltage, a power control signal of a combustion engine mechanically connected to the electric machine, and a prevailing rotational speed of the electric machine.

In an electromechanical power transmission chain comprising the above-described electric system, the second capacitive circuit can be used as an energy buffer for responding to peak power needs whereas the direct voltage of the first capacitive circuit can be kept substantially constant. The substantially constant direct voltage of the first capacitive circuit facilitates the control of the electric machine. Furthermore, as substantial decreases in the direct voltage of the first capacitive circuit can be avoided, the corresponding decreases in the operating efficiency and in the maximum torque of the electric machine can be avoided too.

In accordance with the invention, there is provided also a new electromechanical power transmission chain that is a parallel transmission chain. An electromechanical power transmission chain according to the invention comprises:

an electric machine for receiving mechanical power from a combustion engine and for supplying mechanical power to one or more actuators, and an electric system for supplying electrical power to the electric machine when the electric machine operates as an electric motor and for receiving electrical power from the electric machine when the electric machine operates as a generator, the electric system comprising:

a first capacitive circuit comprising at least one first capacitor, converter equipment for transferring electric power between the first capacitive circuit and the electric machine, the converter equipment being configured to convert a first direct voltage of the first capacitive circuit into an output voltage and to output the output voltage to the electric machine, a second capacitive circuit comprising at least one second capacitor, a direct voltage converter for transferring electric energy between the first and the second capacitive circuits, and a control system for controlling the direct voltage converter in response to changes of the first direct voltage to drive the first direct voltage to a first direct voltage reference value, and for controlling the converter equipment in response to changes of a second direct voltage of the second capacitive circuit to drive the second direct voltage to a second direct voltage reference value, wherein:

the control system is configured to keep fluctuations of the first direct voltage smaller than fluctuations of the second direct voltage when controlling the direct voltage converter and the converter equipment in response to fluctuation of the electric power transferred between the first capacitive circuit and the electric machine, the converter equipment comprises a converter stage for transferring electric energy from the electric machine to the first capacitive circuit when the electric machine operates as a generator, and for transferring electric energy from the first capacitive circuit to the electric machine when the electric machine operates as an electric motor, and the control system is configured to determine a torque reference for the electric machine at least partly based on: the second direct voltage, a power control signal of the combustion engine, and a prevailing rotational speed of the electric machine.

In accordance with the invention, there is provided also a new method for controlling an electromechanical power transmission chain that comprises:

a first capacitive circuit comprising at least one first capacitor, an electric machine, converter equipment configured to transfer electric power between the first capacitive circuit and the electric machine, a second capacitive circuit including at least one second capacitor, and a direct voltage converter, wherein the electromechanical power transmission chain is a parallel transmission chain in which the electric machine is mechanically connected to a combustion engine and to one or more actuators, the converter equipment comprising a converter stage for transferring electric energy from the electric machine to the first capacitive circuit when the electric machine operates as a generator, and for transferring electric energy from the first capacitive circuit to the electric machine when the electric machine operates as an electric motor, and the converter equipment converting a first direct voltage of the first capacitive circuit into an output voltage and outputting the output voltage to the electric machine.

The method according to the invention comprises:

controlling the direct voltage converter to transfer electric energy between the first capacitive circuit and the second capacitive circuit in response to changes of the first direct voltage to drive the first direct voltage to a first direct voltage reference value, controlling the converter equipment in response to changes of a second direct voltage of the second capacitive circuit to drive the second direct voltage to a second direct voltage reference value, determining a torque reference for the electric machine at least partly based on: the second direct voltage, a power control signal of the combustion engine, and a prevailing rotational speed of the electric machine, wherein fluctuations of the first direct voltage are controlled to be smaller than fluctuations of the second direct voltage when the direct voltage converter and the converter equipment are controlled in response to fluctuation of the electric power transferred between the first capacitive circuit and the electric machine.

In accordance with the invention, there is provided also a new computer program for controlling an electromechanical power transmission chain that comprises:

a first capacitive circuit comprising at least one first capacitor, an electric machine, converter equipment configured to transfer electric power between the first capacitive circuit and the electric machine, a second capacitive circuit including at least one second capacitor, and a direct voltage converter, wherein the electromechanical power transmission chain being a parallel transmission chain in which the electric machine is mechanically connected to a combustion engine and to one or more actuators, the converter equipment comprising a converter stage for transferring electric energy from the electric machine to the first capacitive circuit when the electric machine operates as a generator, and for transferring electric energy from the first capacitive circuit to the electric machine when the electric machine operates as an electric motor, and the converter equipment converting a first direct voltage of the first capacitive circuit into an output voltage and outputting the output voltage to the electric machine.

The computer program according to the invention comprises computer executable instructions for controlling a programmable processor to:

control the direct voltage converter to transfer electric energy between the first capacitive circuit and the second capacitive circuit in response to changes of the first direct voltage to drive the first direct voltage to a first direct voltage reference value, control the converter equipment in response to changes of a second direct voltage of the second capacitive circuit to drive the second direct voltage to a second direct voltage reference value, determine a torque reference for the electric machine at least partly based on: the second direct voltage, a power control signal of the combustion engine, and a prevailing rotational speed of the electric machine, wherein fluctuations of the first direct voltage are controlled to be smaller than fluctuations of the second direct voltage when the direct voltage converter and the converter equipment are controlled in response to fluctuation of the electric power transferred between the first capacitive circuit and the electric machine.

A computer program product according to the invention comprises a non-volatile computer readable medium, e.g. a compact disc "CD", encoded with a computer program according to the invention.

Exemplifying and non-limiting embodiments of the invention are described in accompanied dependent claims.

Various exemplifying and non-limiting embodiments of the invention both as to constructions and to methods of operation, together with additional objects and advantages thereof, will be best understood from the following description of specific exemplifying and non-limiting embodiments when read in conjunction with the accompanying drawings.

The verbs "to comprise" and "to include" are used in this document as open limitations that neither exclude nor require the existence of un-recited features.

The features recited in dependent claims are mutually freely combinable unless otherwise explicitly stated. Furthermore, it is to be understood that the use of "a" or "an", i.e. a singular form, throughout this document does not exclude a plurality.

BRIEF DESCRIPTION OF THE FIGURES

Exemplifying and non-limiting embodiments of the invention and their advantages are explained in greater detail below in the sense of examples and with reference to the accompanying drawings, in which.

DESCRIPTION OF THE EXEMPLIFYING EMBODIMENTS

The specific examples provided in the description given below should not be construed as limiting the scope and/or the applicability of the appended claims. Lists and groups of examples provided in the description given below are not exhaustive unless otherwise explicitly stated.

Figure 1:
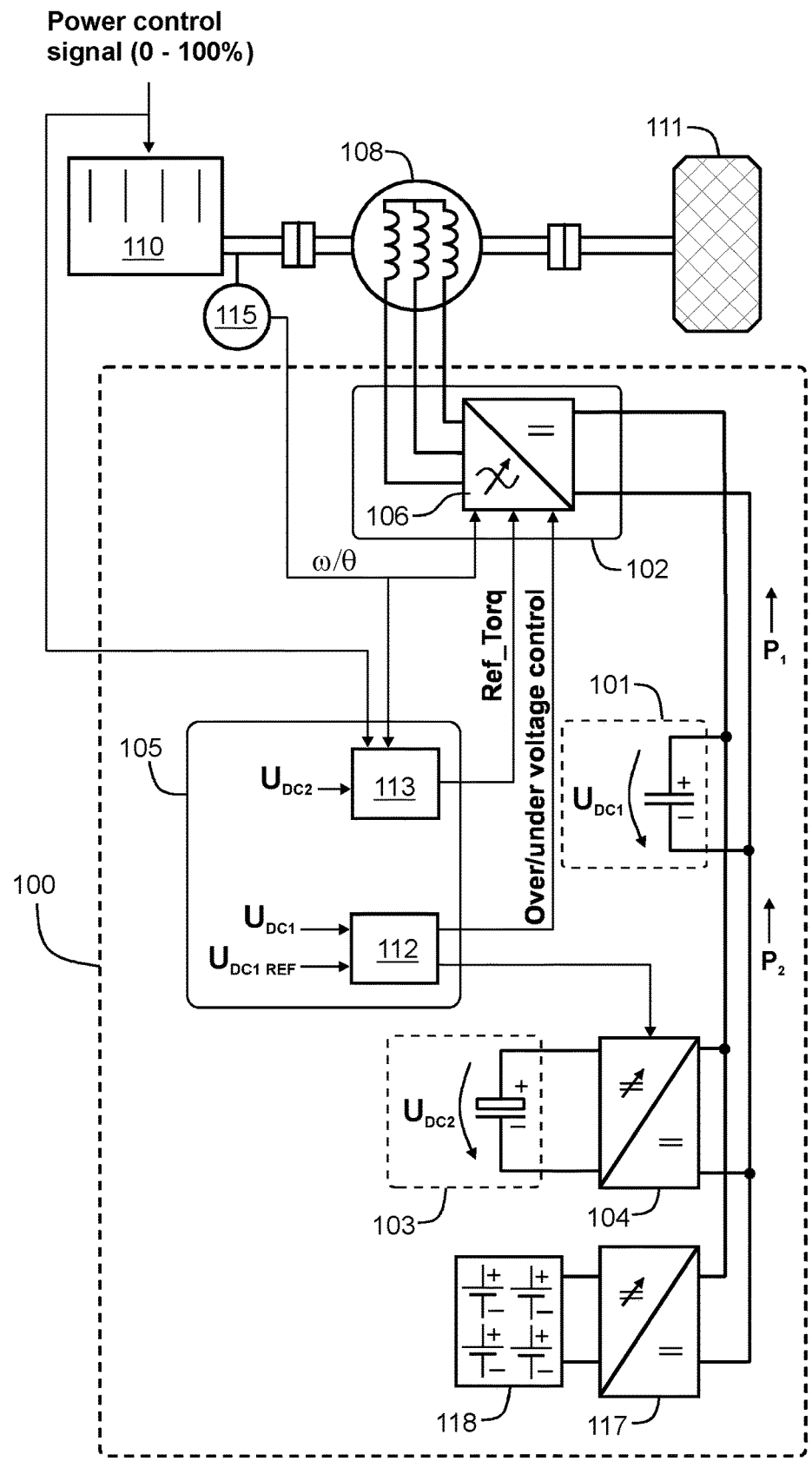
FIG. 1 shows a schematic illustration of an electromechanical power transmission chain that comprises an electric system according to an exemplifying and non-limiting embodiment of the invention.

FIG. 1 shows a schematic illustration of an electromechanical power transmission chain that comprises an electric machine 108 and an electric system 100 according to an exemplifying and non-limiting embodiment of the invention. The electromechanical power transmission chain is a parallel transmission chain where the electric machine 108 and a combustion engine 110 are mechanically connected to each other and both the electric machine 108 and the combustion engine 110 are arranged to supply mechanical power to an actuator 111. The electric machine 108 operates sometimes as a generator which produces electric energy, and sometimes as an electric motor that consumes electric energy and assists the combustion engine 110 when high mechanical output power is needed.

The electric system 100 comprises a first capacitive circuit 101 and converter equipment 102 for transferring electric energy between the first capacitive circuit 101 and the electric machine 108. The converter equipment 102 is configured to convert the direct voltage $U_{DC1}$ of the capacitive circuit 101 into voltages suitable for the electric machine 108. The electric system 100 comprises a second capacitive circuit 103 and a direct voltage converter 104 for transferring electric energy between the capacitive circuits 101 and 103. The electric machine 108 can be for example an electrically excited synchronous machine, a permanent magnet synchronous machine, an asynchronous machine, or a reluctance machine. The electric machine 108 can be an asynchronous machine or a reluctance machine in cases where the converter equipment 102 is capable of supplying reactive power to the electric machine 108, or there are other means for supplying reactive power to the electric machine 108. The electric system 100 may further comprise a battery element 118 and a direct voltage converter 117 for charging and discharging the battery element 118.

The electric system 100 comprises a control system 105 that comprises a first controller 112 for controlling the direct voltage converter 104 in response to changes in direct voltage $U_{DC1}$ of the capacitive circuit 101. The control system 105 further comprises a second controller 113 for controlling the converter equipment 102 in response to changes in direct voltage $U_{DC2}$ of the capacitive circuit 103. The controllers 112 and 113 are configured so that the controller 112 reacts faster to changes of the direct voltage $U_{DC1}$ than the controller 113 reacts to changes of the direct voltage $U_{DC2}$ so as to keep the direct voltage $U_{DC1}$ on a predetermined voltage range, i.e. near to a reference value $U_{DC1\_REF}$, and to simultaneously allow the direct voltage $U_{DC2}$ to fluctuate in response to fluctuation of electric power transferred between the capacitive circuit 101 and the electric machine 108. When the direct voltage converter 104 is controlled to keep the direct voltage $U_{DC1}$ substantially constant, the capacitive circuit 103 is used as an energy buffer for responding to peak power needs of the actuator 111. The substantially constant direct voltage $U_{DC1}$ facilitates the control of the electric machine 108. Furthermore, as substantial decreases in the direct voltage $U_{DC1}$ can be avoided, the corresponding decreases in the operating efficiency and in the maximum torque of the electric machine 108 can be avoided too. In FIG. 1, the electric power transfer between the capacitive circuit 101 and the electric machine 108 is denoted with $P_1$ that is positive when electric energy flows towards the converter equipment 102. The electric power transfer from the capacitive circuit 103 and/or from the battery element 118 to the capacitive circuit 101 is denoted with $P_2$ that is positive when electric energy flows to the capacitive circuit 101. The direct voltage $U_{DC1}$ of the capacitive circuit 101 remains substantially constant when $P_2$ is substantially $P_1$.

Figure 4:
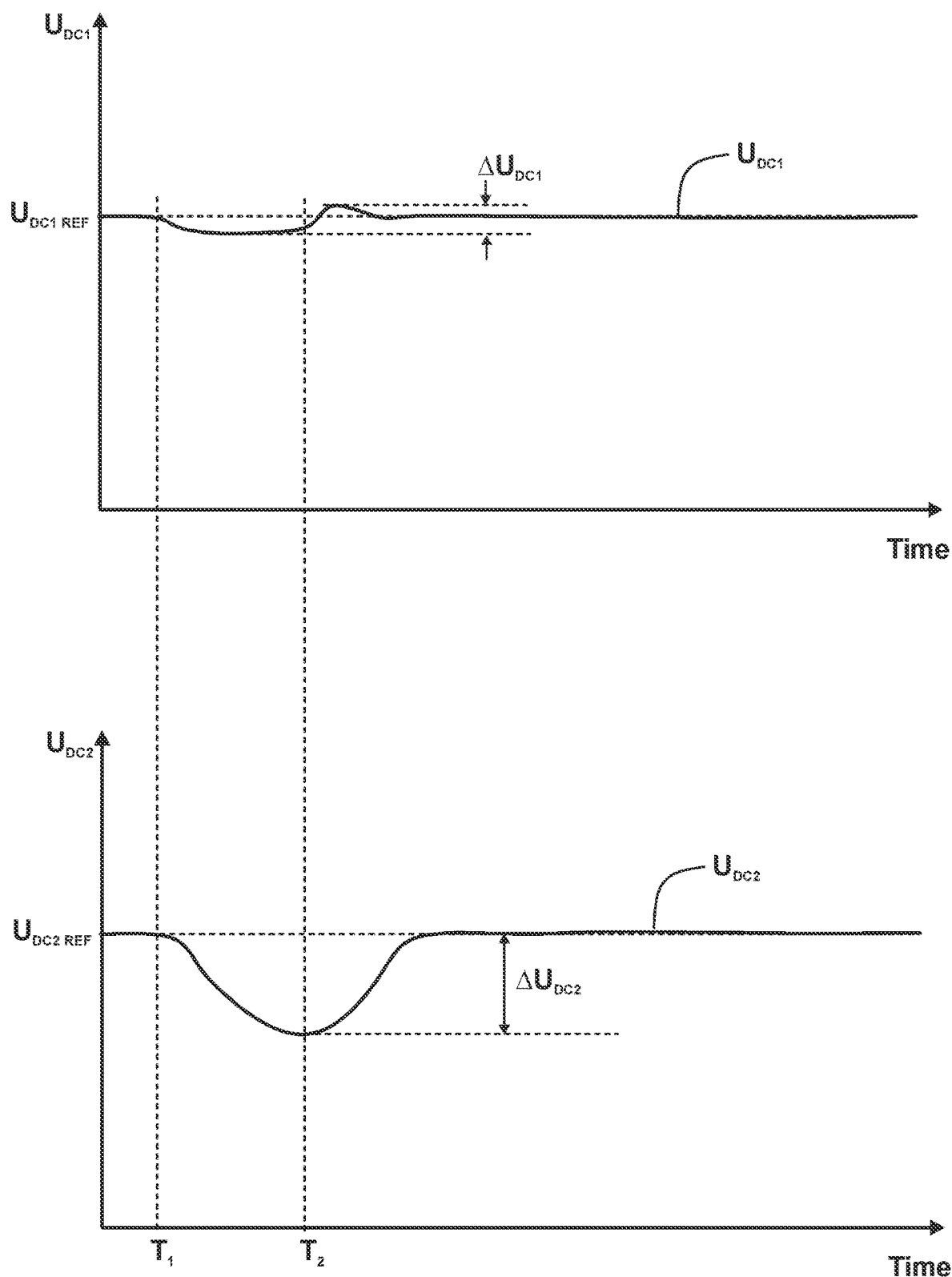
FIG. 4 shows exemplifying time trends direct voltages of an electromechanical power transmission chain according to an exemplifying and non-limiting embodiment of the invention.

FIG. 4 shows time trends of the above-mentioned direct voltages $U_{DC1}$ and $U_{DC2}$ in an exemplifying situation. At the time instant $T_1$, the actuator 111 starts to need more mechanical power and the combustion engine 110 has not yet reacted to the increased power need. Thus, the lacking mechanical power must be generated by the electric machine 108. As a corollary, the converter equipment 102 increases a transfer rate of electric energy from the capacitive circuit 101 to the electric machine 108 and therefore the direct voltages Ucc starts to drop. This is noticed by the controller 112 that increases the transfer rate of electric energy from the capacitive circuit 103 to the capacitive circuit 101 in order to keep the direct voltage $U_{DC1}$ near its reference value $U_{DC1\_REF}$. The direct voltage $U_{DC2}$ deviates more from its reference value $U_{DC2\_REF}$ because the needed electric energy is mainly taken from the capacitive circuit 103. As presented later in this document with more details, the controller 113 can be configured to determine a torque reference Ref_Torq of the electric machine 108 at least partly based on the direct voltage $U_{DC2}$, the power control signal of the combustion engine 110, and the rotational speed ω of the electric machine 108. Thus, the controller 113 can utilize the electric energy $\sim U_{DC2}^2$ stored in the capacitive circuit 103 for setting the speed-torque operating point of the combustion engine 110 in order optimize the efficiency of the combustion engine 110. At the time instant $T_2$, the peak power situation is over and the combustion engine 110 has had time to react to the peak power situation but has not had time to react to the end of the peak power situation. Thus, the combustion engine 110 produces a surplus of mechanical power and therefore the electric machine 108 acts as a generator in order to avoid a situation where the rotation speed ω increases uncontrollably. As a corollary, the converter equipment 102 transfers electric energy from the electric machine 108 to the capacitive circuit 101 and therefore the direct voltages $U_{DC1}$ starts to rise. This is noticed by the controller 112 that increases the transfer rate of electric energy from the capacitive circuit 101 to the capacitive circuit 103 in order to prevent the direct voltage $U_{DC1}$ from exceeding its reference value $U_{DC1\_REF}$ too much. Thus, the slowness of the combustion engine 110 to react to peak power situations can be handled so that the direct voltage $U_{DC1}$ does not significantly change, i.e. $\Delta U_{DC1}$ is small, but the temporary power needs are satisfied by the electric energy stored in the capacitive circuit 103 by allowing the direct voltage $U_{DC2}$ to change, i.e. $\Delta U_{DC2} > \Delta U_{DC1}$. Thus, the input voltage of the converter equipment 102 i.e. $U_{DC1}$ can be substantially stable, which facilitates the operation of the converter equipment 102. Furthermore, the electric energy stored in the capacitive circuit 103 can be used for temporarily optimizing the efficiency of the combustion engine 110.

The capacitance of the capacitive circuit 103 that can be used as an energy buffer is advantageously greater than the capacitance of the capacitive circuit 101 whose voltage $U_{DC1}$ is preferably kept substantially constant. The capacitive circuit 103 may comprise for example one or more electric double-layer capacitors "EDLC". In many contexts, an electric double-layer capacitor is called a "super capacitor". The direct voltage converter 104 is a bidirectional converter capable of transferring electric energy to and from the capacitive circuit 103. In cases where the direct voltage $U_{DC1}$ is higher than the direct voltage $U_{DC2}$, the direct voltage converter 104 can be implemented for example with one or more inverter branches of an inverter bridge and with one or more inductor coils so that the direct voltage poles of each inverter branch are connected to the capacitive circuit 101, the alternating voltage pole of each inverter branch is connected via an inductor coil to the positive pole of the capacitive circuit 103, and the negative pole of the capacitive circuit 103 is connected to the negative direct voltage pole of each inverter branch. It is to be however noted that the direct voltage converter 104 can be implemented in many different ways.

In the exemplifying electromechanical power transmission chain illustrated in FIG. 1, the converter equipment 102 comprises a converter stage 106 for transferring electric energy from the electric machine 108 to the capacitive circuit 101 when the electric machine acts as a generator, and for transferring electric energy from the capacitive circuit 101 to the electric machine 108 when the electric machine acts an electric motor. The converter stage 106 can be for example a pulse width modulation "PWM" converter stage.

In the exemplifying case shown in FIG. 1, the combustion engine 110 is controlled by an externally given power control signal. The power control signal can determine for example the fuel and air supply of the combustion engine 110.

The controller 113 can be configured to determine a torque reference Ref_Torq for the electric machine 108 at least partly on the basis of the direct voltage $U_{DC2}$, the power control signal of the combustion engine 110, and the prevailing or estimated rotational speed of the electric machine 108. In the exemplifying case shown in FIG. 1, the prevailing rotational speed ω is measured with a rotational speed sensor 115. The reference torque Ref_Torq can be determined for example in the following exemplifying way:

Motor power MP and generator power GP for the electric machine 108 can be determined as functions of the direct voltage $U_{DC2}$ so that:
  the motor power $MP(U_{DC2})$ is zero when $U_{DC2} \leq$ motor limit voltage $U_M$,
  the motor power $MP(U_{DC2})$ is an increasing function of the $U_{DC2}$ when $U_{DC2} > U_M$,
  the generator power $GP(U_{DC2})$ is zero when $U_{DC2} \geq$ generator limit voltage $U_G$, and
  the generator power $GP(U_{DC2})$ is a decreasing function of the $U_{DC2}$ when $U_{DC2} < U_G$, where $U_G > U_M$ i.e. the voltage area of allowed motor operation of the electric machine 108 and the voltage area of allowed generator operation of the electric machine 108 are partially overlapping.

After an increase in the above-mentioned power control signal of the combustion engine 110, the electric machine 108 is run as an electric motor in the torque control mode so that the Ref_Torq is substantially the motor power $MP(U_{DC2})$ divided by the prevailing rotational speed $\omega$. Thus, in cases where the $U_{DC2}$ is above the motor limit voltage $U_M$, an increase in the power control signal is responded not only by the combustion engine 110 but also by the electric machine 108 depending on the direct voltage $U_{DC2}$. After a decrease in the above-mentioned power control signal, the electric machine 108 is run as a generator in the torque control mode so that the Ref_Torq is substantially the generator power $GP(U_{DC2})$ divided by the prevailing rotational speed $\omega$. Thus, in cases where the $U_{DC2}$ is below the generator limit voltage $U_G$, a decrease in the power control signal is responded not only by the combustion engine 110 but also by the electric machine 108 depending on the direct voltage $U_{DC2}$.

In an electric system according to an exemplifying and non-limiting embodiment of the invention, the controller 113 of the control system 105 is configured to react to changes of the direct voltage $U_{DC2}$ slower when the direct voltage $U_{DC2}$ is on a predetermined voltage range than when the direct voltage $U_{DC2}$ is outside the predetermined voltage range. As the controller 113 is configured to be slower when the direct voltage $U_{DC2}$ is on the predetermined voltage range, the electric energy $\frac{1}{2}C_2U_{DC2}^2$ stored by the capacitive circuit 103 responds effectively to peak power needs of the actuator 111 when the direct voltage $U_{DC2}$ is on the predetermined voltage range. On the other hand, the direct voltage $U_{DC2}$ can be kept sufficiently well in the predetermined voltage range because the controller 113 responds faster when the direct voltage $U_{DC2}$ tends to exit the predetermined voltage range. The controller 113 can be configured to be slower when the direct voltage $U_{DC2}$ is on the predetermined voltage range for example so that the control gain of the controller 113 is smaller when the direct voltage $U_{DC2}$ is on the predetermined voltage range than when the direct voltage $U_{DC2}$ is outside the predetermined voltage range.

In an electric system according to an exemplifying and non-limiting embodiment of the invention, the controller 113 of the control system 105 is configured to control the converter equipment 102 at least partly based on the deviation of the direct voltage $U_{DC2}$ from its reference $U_{DC2\ REF}$, i.e. $U_{DC2} - U_{DC2\ REF}$. The controller 113 can be configured to weight the deviation $U_{DC2} - U_{DC2\ REF}$ with a first gain coefficient $G_1$ when the deviation is positive and with a second gain coefficient $G_2$ different from the first gain coefficient when the deviation is negative. The first gain coefficient $G_1$ has a value different from that of the second gain coefficient $G_2$ because the reference $U_{DC2\ REF}$ is typically not in the middle of the allowed range of variation of the direct voltage $U_{DC2}$. The situation where the reference $U_{DC2\ REF}$ is not in the middle of the allowed range of variation of the direct voltage $U_{DC2}$ is present when the reference level of the energy $\frac{1}{2}C_2U_{DC2\ REF}^2$ is in the middle of the allowed range of variation of the energy. In many cases, it is advantageous that the energy has similar safety margins below and above the reference level of the energy, i.e. the reference level of the energy is in the middle of the allowed range of variation of the energy. In these cases, the safety margin of the direct voltage $U_{DC2}$ above the reference $U_{DC2\ REF}$ is narrower than the safety margin of the direct voltage $U_{DC2}$ below the reference $U_{DC2\ REF}$. This is a corollary of the fact that the energy is not directly proportional to the direct voltage $U_{DC2}$ but, instead, directly proportional to the square of the direct voltage $U_{DC2}$. The first gain coefficient $G_1$ that is used on the narrower safety margin of the $U_{DC2}$, i.e. when the deviation $U_{DC2} - U_{DC2\ REF}$ is positive, has preferably a bigger value than the second gain coefficient $G_2$ that is used on the wider safety margin of the $U_{DC2}$, i.e. when the deviation $U_{DC2} - U_{DC2\ REF}$ is negative. Therefore, in this exemplifying case, the controller 113 is faster to react to changes in the $U_{DC2}$ when the $U_{DC2}$ is above the $U_{DC2\ REF}$ and thereby the changes in the $U_{DC2}$ correspond to stronger changes in the energy $\frac{1}{2}C_2U_{DC2}^2$ than when the $U_{DC2}$ is below the $U_{DC2\ REF}$ and the changes in $U_{DC2}$ correspond to smaller changes in the energy $\frac{1}{2}C_2U_{DC2}^2$.

In an electric system according to an exemplifying and non-limiting embodiment of the invention, the controller 112 of the control system 105 is configured to provide over-voltage protection. The controller 112 is configured to control the converter equipment 102 to reduce electric power transfer to the capacitive circuit 101 in response to a situation in which the direct voltage $U_{DC1}$ exceeds a predetermined over-voltage limit. Using the notations shown in FIG. 1, the electric power transfer to the first capacitive circuit 101 is $P_2 - P_1$. Thus, the electric power transfer to the first capacitive circuit 101 can be reduced by controlling the converter equipment 102 to increase the electric power transfer $P_1$. The electric power transfer $P_1$ increases when the electric power taken from the electric machine 108 when acting as a generator is decreased or the electric power supplied to the electric machine 108 when acting as an electric motor is increased. The electric power taken from the electric machine 108 when acting as a generator can be decreased by decreasing the torque reference of the electric machine 108.

In an electric system according to an exemplifying and non-limiting embodiment of the invention, the controller 112 of the control system 105 is configured to provide under-voltage protection. The controller 112 is configured to control the converter equipment 102 to reduce the electric power transfer from the capacitive circuit 101 in response to a situation in which the direct voltage $U_{DC1}$ falls below a predetermined under-voltage limit. Using the notations shown in FIG. 1, the electric power transfer from the first capacitive circuit 101 is $P_1 - P_2$. Thus, the electric power transfer from the first capacitive circuit 101 can be reduced by controlling the converter equipment 102 to decrease the electric power transfer $P_1$. The electric power transfer $P_1$ decreases when the electric power taken from the electric machine 108 when acting as a generator is increased or the electric power supplied to the electric machine 108 when acting as an electric motor is decreased. The electric power taken from the electric machine 108 when acting as a generator can be increased by increasing the torque reference of the electric machine 108.

Figure 2:
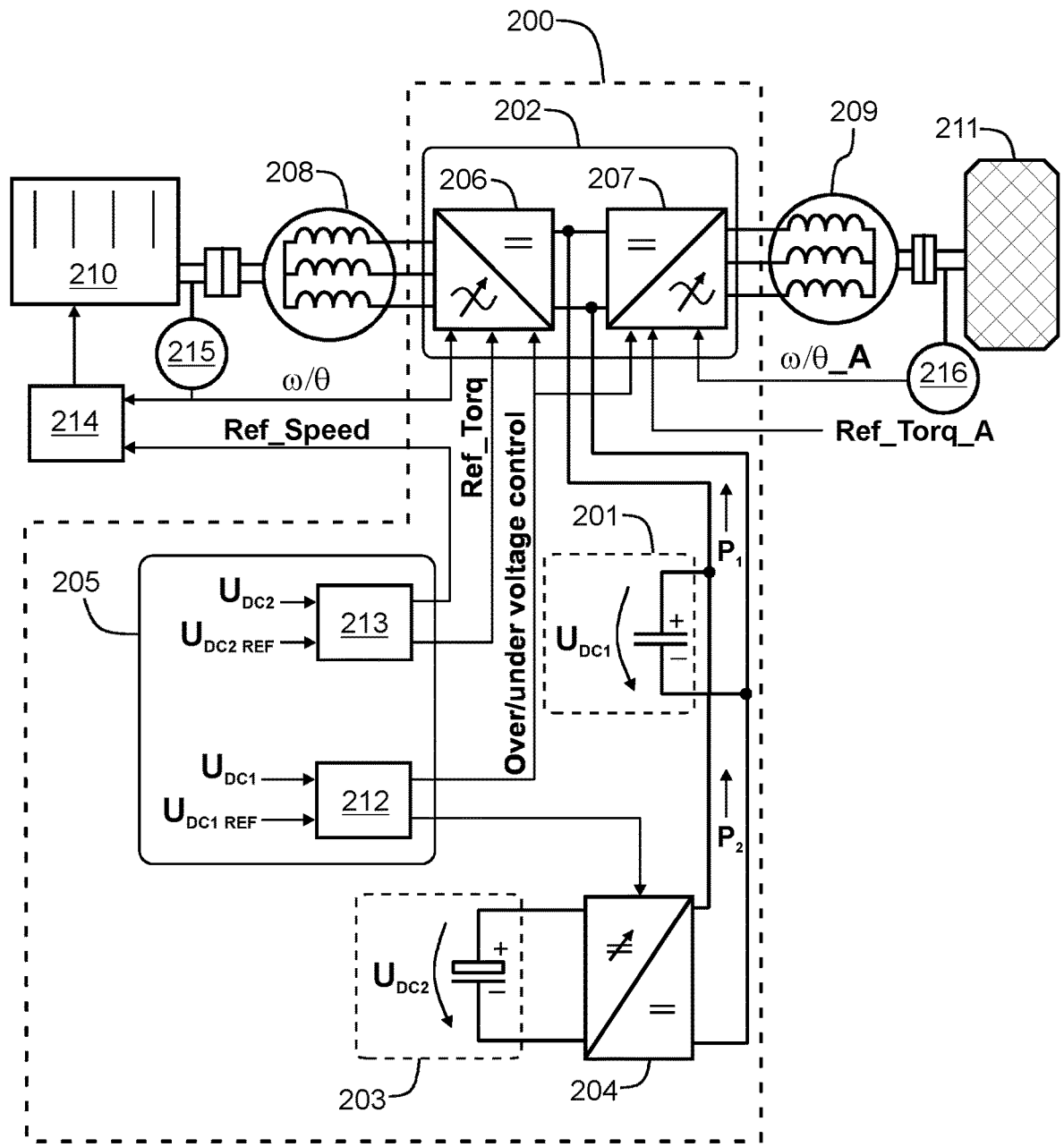
FIG. 2 shows a schematic illustration of an electromechanical power transmission chain that is a serial transmission chain.

FIG. 2 shows a schematic illustration of an electromechanical power transmission chain that comprises electric machines 208 and 209 and an electric system 200. In this exemplifying case, the electromechanical power transmission chain is a series transmission chain where the electric machine 208 acts as a generator that is driven with a combustion engine 210 and the electric machine 208 acts mainly as an electric motor that drives an actuator 211. The actuator 211 can be for example a wheel or a chain track of e.g. a vehicle or a mobile working machine, a hydraulic pump, or some other device to be driven with mechanical power. The electric machine 209 may temporarily act as a generator during braking actions. The electric system 200 comprises a first capacitive circuit 101 and converter equipment 202 for transferring electric energy between the first capacitive circuit 201 and the electric machines 208 and 209. The converter equipment 202 is configured to convert the direct voltage $U_{DC1}$ of the capacitive circuit 201 into voltages suitable for the electric machines 208 and 209. The electric machine 208 can be for example an electrically excited synchronous machine, a permanent magnet synchronous machine, an asynchronous machine, or a reluctance machine. The electric machine 208 can be an asynchronous machine or a reluctance machine in cases where the converter equipment 202 is capable of supplying reactive power to the electric machine 208, or there are other means for supplying reactive power to the electric machine 208. The electric machine 209 can be for example an electrically excited synchronous machine, a permanent magnet synchronous machine, an asynchronous machine, or a reluctance machine. It is also possible that an electromechanical power transmission chain comprises one or more direct current "DC" machines.

The electric system 200 comprises a second capacitive circuit 203, and a direct voltage converter 204 for transferring electric energy between the capacitive circuits 201 and 203. The electric system 200 comprises a control system 205 that comprises a first controller 212 for controlling the direct voltage converter 204 in response to changes in the direct voltage $U_{DC1}$ of the capacitive circuit 201. The control system 105 further comprises a second controller 213 for controlling the converter equipment 202 in response to changes in the direct voltage $U_{DC2}$ of the capacitive circuit 203. The controller 212 may comprise for example a proportional and integrative "PI" controller which receives a measured value of the direct voltage $U_{DC1}$ and which tries to keep the direct voltage $U_{DC1}$ at its reference value $U_{DC1\ REF}$ by controlling the operation of the direct voltage converter 204. Correspondingly, the controller 213 may comprise for example a proportional and integrative "PI" controller which receives a measured value of the direct voltage $U_{DC2}$ and which tries to keep the direct voltage $U_{DC2}$ at its reference value $U_{DC2\ REF}$ by controlling the operation of the converter equipment 202. The controllers 212 and 213 are configured so that the controller 212 reacts faster to changes in the direct voltage $U_{DC1}$ than the controller 213 reacts to changes in the direct voltage $U_{DC2}$ so as to keep the direct voltage $U_{DC1}$ on a predetermined voltage range, i.e. near to the reference value $U_{DC1\ REF}$, and to simultaneously allow the direct voltage $U_{DC2}$ to fluctuate in response to fluctuation of electric power transferred between the first capacitive circuit 201 and the electric machines 208 and 209.

In FIG. 2, the electric power transfer between the capacitive circuit 201 and the electric machines 208 and 209 is denoted with $P_1$ that is positive when electric energy flows towards the converter equipment 202. The electric power transfer between the capacitive circuits 201 and 203 is denoted with $P_2$ that is positive when electric energy flows away from the capacitive circuit 203. The direct voltage $U_{DC1}$ of the capacitive circuit 201 remains substantially constant when $P_2$ is substantially $P_1$, i.e. $d(\frac{1}{2}C_2 U_{DC2}^2)/dt = C_2 U_{DC2} dU_{DC2}/dt = P_1$, where $\frac{1}{2}C_2 U_{DC2}^2$ is the electric energy stored by the capacitive circuit 203 and $C_2$ is the capacitance of the capacitive circuit 203. When the direct voltage converter 204 is controlled to keep the direct voltage $U_{DC1}$ substantially constant, $P_2$ i.e. $d(\frac{1}{2}C_2 U_{DC2}^2)/dt$ is substantially $P_1$ and thus the capacitive circuit 203 is used as an energy buffer for responding to peak power needs of the actuator 211. The substantially constant direct voltage $U_{DC1}$ facilitates the control of the electric machines 208 and 209. Furthermore, as substantial decreases in the direct voltage $U_{DC1}$ can be avoided, the corresponding decreases in the operating efficiencies and in the maximum torques of the electric machines 208 and 209 can be avoided too.

The capacitance $C_2$ of the capacitive circuit 203 that can be used as an energy buffer is advantageously greater than the capacitance of the capacitive circuit 201 whose voltage $U_{DC1}$ is preferably kept substantially constant. The capacitive circuit 203 may comprise for example one or more electric double-layer capacitors "EDLC". In many contexts, an electric double-layer capacitor is called a "super capacitor". The direct voltage converter 204 is a bidirectional converter capable of transferring electric energy to and from the capacitive circuit 203. In cases where the direct voltage $U_{DC1}$ is higher than the direct voltage $U_{DC2}$, the direct voltage converter 204 can be implemented for example with one or more inverter branches of an inverter bridge and with one or more inductor coils so that the direct voltage poles of each inverter branch are connected to the capacitive circuit 201, the alternating voltage pole of each inverter branch is connected via an inductor coil to the positive pole of the capacitive circuit 203, and the negative pole of the capacitive circuit 203 is connected to the negative direct voltage pole of each inverter branch. It is to be however noted that the direct voltage converter 204 can be implemented in many different ways.

The controller 213 of the control system 205 can be configured to react to changes of the direct voltage $U_{DC2}$ slower when the direct voltage $U_{DC2}$ is on a predetermined voltage range than when the direct voltage $U_{DC2}$ is outside the predetermined voltage range. As the controller 213 is configured to be slower when the direct voltage $U_{DC2}$ is on the predetermined voltage range, the electric energy $\frac{1}{2}C_2 U_{DC2}^2$ stored by the capacitive circuit 203 responds effectively to peak power needs of the actuator 211 when the direct voltage $U_{DC2}$ is on the predetermined voltage range. On the other hand, the direct voltage $U_{DC2}$ can be kept sufficiently well in the predetermined voltage range because the controller 213 responds faster when the direct voltage $U_{DC2}$ tends to exit the predetermined voltage range. The controller 213 can be configured to be slower when the direct voltage $U_{DC2}$ is on the predetermined voltage range for example so that the control gain of the controller 213 is smaller when the direct voltage $U_{DC2}$ is on the predetermined voltage range than when the direct voltage $U_{DC2}$ is outside the predetermined voltage range.

The controller 213 of the control system 205 can be configured to control the converter equipment 202 at least partly based on the deviation of the direct voltage $U_{DC2}$ from the reference $U_{DC2\ REF}$, i.e. $U_{DC2} - U_{DC2\ REF}$. The controller 213 can be configured to weight the deviation $U_{DC2} - U_{DC2\ REF}$ with a first gain coefficient $G_1$ when the deviation is positive and with a second gain coefficient $G_2$ different from the first gain coefficient when the deviation is negative. The first gain coefficient $G_1$ has a value different from that of the second gain coefficient $G_2$ because the reference $U_{DC2\ REF}$ is typically not in the middle of the allowed range of variation of the direct voltage $U_{DC2}$. The situation where the reference $U_{DC2\ REF}$ is not in the middle of the allowed range of variation of the direct voltage $U_{DC2}$ is present when the reference level of the energy $\frac{1}{2}C_2 U_{DC2\ REF}^2$ is in the middle of the allowed range of variation of the energy. In many cases, it is advantageous that the energy has similar safety margins below and above the reference level of the energy, i.e. the reference level of the energy is in the middle of the allowed range of variation of the energy. In these cases, the safety margin of the direct voltage $U_{DC2}$ above the reference $U_{DC2\_REF}$ is narrower than the safety margin of the direct voltage $U_{DC2}$ below the reference $U_{DC2\_REF}$. This is a corollary of the fact that the energy is not directly proportional to the direct voltage $U_{DC2}$ but, instead, directly proportional to the square of the direct voltage $U_{DC2}$. The first gain coefficient $G_1$ that is used on the narrower safety margin of the $U_{DC2}$, i.e. when the deviation $U_{DC2}-U_{DC2\_REF}$ is positive, has preferably a bigger value than the second gain coefficient $G_2$ that is used on the wider safety margin of the $U_{DC2}$, i.e. when the deviation $U_{DC2}-U_{DC2\_REF}$ is negative. Therefore, in this exemplifying case, the controller 213 is faster to react to changes in the $U_{DC2}$ when the $U_{DC2}$ is above the $U_{DC2\_REF}$ and thereby the changes in the $U_{DC2}$ correspond to stronger changes in the energy $\frac{1}{2}C_2 U_{DC2}^2$ than when the $U_{DC2}$ is below the $U_{DC2\_REF}$ and the changes in $U_{DC2}$ correspond to smaller changes in the energy $\frac{1}{2}C_2 U_{DC2}^2$.

The controller 212 of the control system 205 can be configured to provide over-voltage protection. The controller 212 can be configured to control the converter equipment 202 to reduce electric power transfer to the capacitive circuit 201 in response to a situation in which the direct voltage $U_{DC1}$ exceeds a predetermined over-voltage limit. Using the notations shown in FIG. 2, the electric power transfer to the first capacitive circuit 201 is $P_2-P_1$. Thus, the electric power transfer to the first capacitive circuit 201 can be reduced by controlling the converter equipment 202 to increase the electric power transfer $P_1$. The electric power transfer $P_1$ increases when the electric power taken from the electric machine 208 acting as a generator is decreased and/or the electric power supplied to the electric machine 209 acting as an electric motor is increased. The electric power taken from the electric machine 208 can be decreased by decreasing the torque reference of the electric machine 208.

The controller 212 of the control system 205 can be configured to provide under-voltage protection. The controller 212 can be configured to control the converter equipment 202 to reduce the electric power transfer from the capacitive circuit 201 in response to a situation in which the direct voltage $U_{DC1}$ falls below a predetermined under-voltage limit. Using the notations shown in FIG. 2, the electric power transfer from the first capacitive circuit 201 is $P_1-P_2$. Thus, the electric power transfer from the first capacitive circuit 201 can be reduced by controlling the converter equipment 202 to decrease the electric power transfer $P_1$. The electric power transfer $P_1$ decreases when the electric power taken from the electric machine 208 acting as a generator is increased and/or the electric power supplied to the electric machine 209 acting as an electric motor is decreased. The electric power taken from the electric machine 208 can be increased by increasing the torque reference of the electric machine 208.

In the exemplifying electromechanical power transmission chain illustrated in FIG. 2, the converter equipment 202 comprises a first converter stage 206 for transferring electric energy from the electric machine 208 acting as a generator to the capacitive circuit 201 and a second converter stage 207 for transferring electric energy from the capacitive circuit 201 to the electric machine 209 acting as an electric motor. The converter stages 206 and 207 can be for example pulse width modulation "PWM" converter stages. In the exemplifying case shown in FIG. 2, the actuator 211 is assumed to be driven according to an externally given torque reference Ref_Torq_A. The converter stage 207 is configured to control the torque of the electric machine 209 in accordance with the externally given torque reference Ref_Torq_A. Depending on the required control accuracy, the control of the electric machine 209 can be a scalar control with or without a rotational speed and/or position measurement, or a vector control with or without the rotational speed and/or position measurement. In the exemplifying case shown in FIG. 2, the control of the electric machine 209 comprises a rotational speed and/or position measurement implemented with a rotational speed and/or position sensor 216 that produces a rotational speed and/or position signal ω/θ_A. It is also possible that the actuator 211 is driven according to an externally given rotational speed or position reference.

The controller 213 of the control system 205 can be configured to determine a power reference for the electric machine 208 at least partly on the basis of the direct voltage $U_{DC2}$ so that the power reference is typically increased when the direct voltage $U_{DC2}$ is below its reference $U_{DC2\_REF}$ and the power reference is typically decreased when the direct voltage $U_{DC2}$ is above its reference $U_{DC2\_REF}$. Furthermore, the power reference of the electric machine 208 can be made dependent on the electric power supplied to the electric machine 209. The controller 213 can be further configured to determine torque and rotational speed references Ref_Torq and Ref_Speed for the electric machine 208 on the basis of the above-mentioned power reference and pre-stored data that expresses an advantageous torque-speed operating point for the combustion engine 210 in a situation where the combustion engine 210 produces mechanical power substantially equal to the power reference. The pre-stored data may express for example a torque-speed operating point at which the combustion engine 210 is able to produce the required mechanical power with maximal efficiency, i.e. with minimal losses. For another example, the pre-stored data may express a torque-speed operating point at which the combustion engine 210 is able to produce the required mechanical power with near maximal efficiency, i.e. with near minimal losses, and at which the combustion engine 210 has a sufficient ability to respond changes.

In the exemplifying case shown in FIG. 2, the combustion engine 210 is driven in a rotational speed control mode with the aid of a speed controller 214. The speed controller 214 may control e.g. the fuel and air supply of the combustion engine 210 on the basis of the above-mentioned rotational speed reference Ref_Speed and a rotational speed and/or position signal ω/θ that is produced with a rotational speed and/or position sensor 215. The converter stage 206 is configured to control the torque of the electric machine 208 in accordance with the above-mentioned torque reference Ref_Torq. Depending on the required control accuracy, the control of the electric machine 208 can be a scalar control with or without a rotational speed and/or position measurement, or a vector control with or without the rotational speed and/or position measurement. In the exemplifying case illustrated in FIG. 2, the rotational speed and/or position signal ω/θ is utilized in the control of the electric machine 208. It is also possible that the electric machine 208 is driven in the rotational speed control mode and the combustion engine is driven in the torque control mode.

Figure 3:
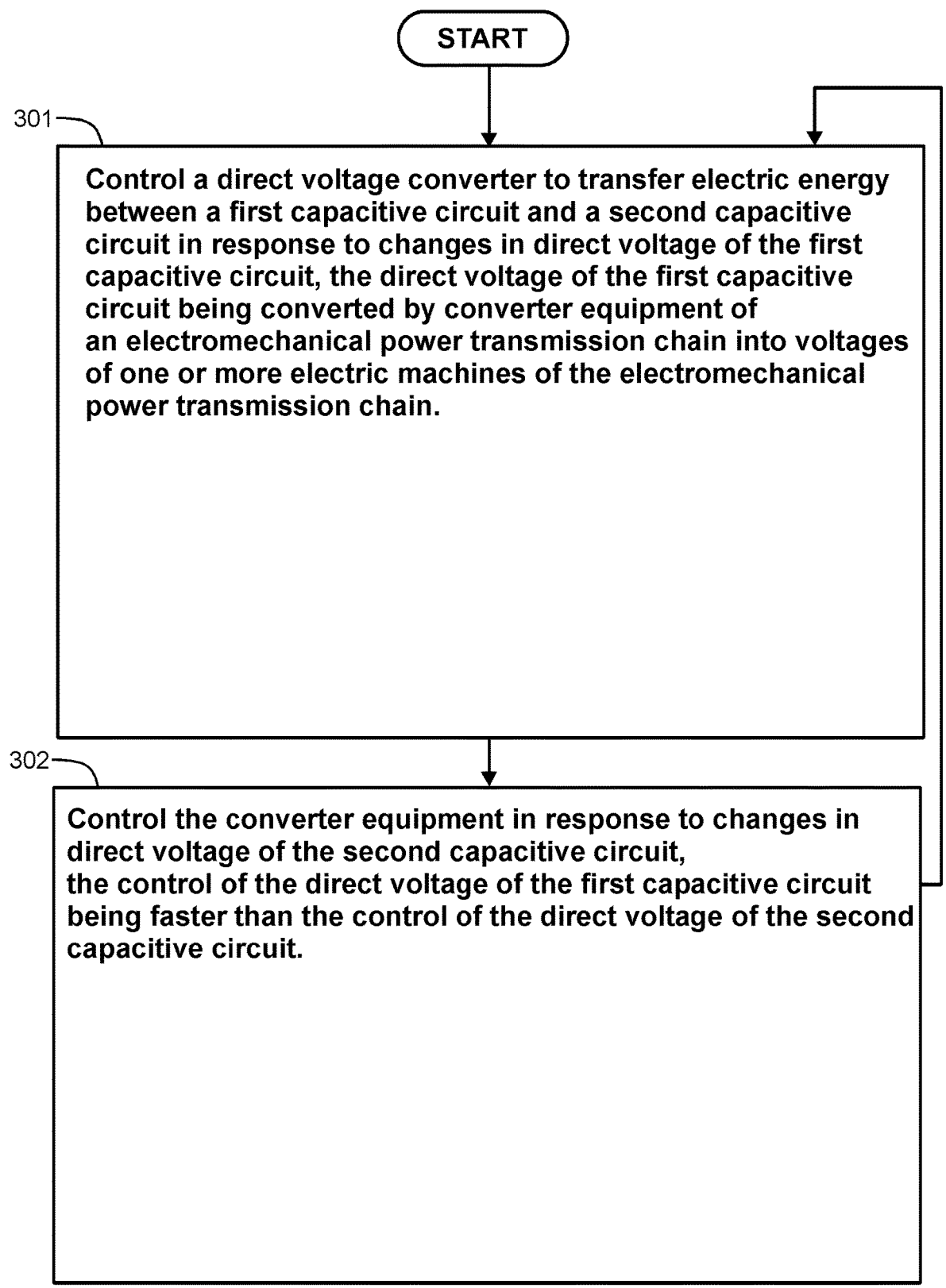
FIG. 3 shows a flowchart of a method according to an exemplifying and non-limiting embodiment of the invention for controlling an electromechanical power transmission chain.

FIG. 3 shows a flowchart of a method according to an exemplifying and non-limiting embodiment of the invention for controlling an electromechanical power transmission chain that comprises a first capacitive circuit, one or more electric machines, and converter equipment transferring electric energy between the first capacitive circuit and the one or more electric machines, the converter equipment converting first direct voltage of the first capacitive circuit into one or more voltages suitable for the one or more electric machines.

The method comprises the following actions:

action 301: controlling a direct voltage converter to transfer electric energy between the first capacitive circuit and a second capacitive circuit in response to changes of the first direct voltage, and action 302: controlling the converter equipment in response to changes of second direct voltage of the second capacitive circuit so that the control of the direct voltage converter is faster to react to the changes of the first direct voltage than the control of the converter equipment is to react to the changes of the second direct voltage so as to keep the first direct voltage on a first predetermined voltage range and to allow the second direct voltage to fluctuate in response to fluctuation of electric power transferred between the first capacitive circuit and the one or more electric machines.

In a method according to an exemplifying and non-limiting embodiment of the invention, the control of the converter equipment reacts slower to changes of the second direct voltage when the second direct voltage is on a second predetermined voltage range than when the second direct voltage is outside the second predetermined voltage range.

In a method according to an exemplifying and non-limiting embodiment of the invention, the control of the converter equipment is at least partly based on a deviation of the second direct voltage from a reference, and the deviation is weighted with a first gain coefficient when the deviation is positive and with a second gain coefficient different from the first gain coefficient when the deviation is negative.

In a method according to an exemplifying and non-limiting embodiment of the invention, the converter equipment is controlled to reduce transfer of electric energy to the first capacitive circuit in response to a situation in which the first direct voltage exceeds a predetermined over-voltage limit.

In a method according to an exemplifying and non-limiting embodiment of the invention, the converter equipment is controlled to reduce transfer of electric energy from the first capacitive circuit in response to a situation in which the first direct voltage falls below a predetermined under-voltage limit.

In a method according to an exemplifying and non-limiting embodiment of the invention, the capacitance of the second capacitive circuit is greater than the capacitance of the first capacitive circuit.

In a method according to an exemplifying and non-limiting embodiment of the invention, the second capacitive circuit comprises at least one electric double-layer capacitor.

In a method according to an exemplifying and non-limiting embodiment of the invention, the electromechanical power transmission chain is a series transmission chain and the converter equipment comprises a first converter stage for transferring electric energy from a first electric machine acting as a generator to the first capacitive circuit and a second converter stage for transferring electric energy from the first capacitive circuit to a second electric machine acting as an electric motor.

In a method according to an exemplifying and non-limiting embodiment of the invention, a power reference is determined for the first electric machine at least partly on the basis of the second direct voltage, and torque and speed references are determined for the first electric machine on the basis of the power reference and pre-stored data expressing a torque-speed operating point for a combustion engine producing mechanical power substantially equal to the power reference.

In a method according to an exemplifying and non-limiting embodiment of the invention, the electromechanical power transmission chain is a parallel transmission chain and the converter equipment comprises a converter stage for transferring electric energy from an electric machine to the first capacitive circuit when the electric machine acts as a generator, and for transferring electric energy from the first capacitive circuit to the electric machine when the electric machine acts an electric motor.

In a method according to an exemplifying and non-limiting embodiment of the invention, a torque reference is determined for the electric machine of the parallel transmission chain at least partly on the basis of the second direct voltage, a power control signal of a combustion engine mechanically connected to the electric machine, and the prevailing rotational speed of the electric machine.

A computer program according to an exemplifying and non-limiting embodiment of the invention for controlling an electromechanical power transmission chain comprises computer executable instructions for controlling a programmable processor to carry out a method according to any of the above-described exemplifying and non-limiting embodiments of the invention.

A computer program according to an exemplifying and non-limiting embodiment of the invention comprises software modules for controlling an electromechanical power transmission chain that comprises a first capacitive circuit, one or more electric machines, and converter equipment for transferring electric energy between the first capacitive circuit and the one or more electric machines, the converter equipment being configured to convert first direct voltage of the first capacitive circuit into one or more voltages suitable for the one or more electric machines.

The software modules comprise computer executable instructions for controlling a programmable processor to:

control a direct voltage converter to transfer electric energy between the first capacitive circuit and a second capacitive circuit in response to changes of the first direct voltage, and control the converter equipment in response to changes of second direct voltage of the second capacitive circuit so that the control of the direct voltage converter is faster to react to the changes of the first direct voltage than the control of the converter equipment is to react to the changes of the second direct voltage so as to keep the first direct voltage on a predetermined voltage range and to allow the second direct voltage to fluctuate in response to fluctuation of electric power transferred between the first capacitive circuit and the one or more electric machines.

The software modules can be for example subroutines and/or functions generated with a suitable programming language.

A computer program product according to an exemplifying and non-limiting embodiment of the invention comprises a non-volatile computer readable medium, e.g. a compact disc "CD", encoded with the above-mentioned software modules.

A signal according to an exemplifying and non-limiting embodiment of the invention is encoded to carry information defining a computer program according to an embodiment of the invention.

The specific examples provided in the description given above should not be construed as limiting the applicability and/or the interpretation of the appended claims. Lists and groups of examples provided in the description given above are not exhaustive unless otherwise explicitly stated.

The invention claimed is:

1. An electric system comprising:
   a first capacitive circuit comprising at least one first capacitor;
   converter equipment configured to transfer electric energy between the first capacitive circuit and an electric machine, the converter equipment being configured to convert a first direct voltage of the first capacitive circuit into an output voltage and to output the output voltage to the electric machine, the converter equipment comprising a converter stage configured to transfer electric energy from the electric machine to the first capacitive circuit when the electric machine operates as a generator and configured to transfer electric energy from the first capacitive circuit to the electric machine when the electric machine operates as an electric motor;
   a second capacitive circuit comprising at least one second capacitor;
   a direct voltage converter configured to transfer electric energy between the first and the second capacitive circuits; and
   a control system configured to
      determine a torque reference used to drive the electric machine, with the converter equipment, as either the electric motor or the generator, the torque reference being determined at least partly based on:
         a second direct voltage of the second capacitive circuit,
         a power control signal of a combustion engine mechanically connected to the electric machine, the power control signal being used to determine a fuel and air supply of the combustion engine, and
         a rotational speed of the electric machine,
         wherein the torque reference is equal to a motor power for the electric machine divided by the rotational speed when the electric machine operates as the electric motor or is equal to a generator power for the electric machine divided by the rotational speed when the electric machine operates as the generator,
      control the direct voltage converter to transfer the electric energy between the first and the second capacitive circuits, in response to changes of the first direct voltage with respect to a first direct voltage reference value to drive the first direct voltage to the first direct voltage reference value,
      control the converter equipment to change the transfer of the electric energy from the electric machine to the first capacitive circuit when the electric machine operates as the generator and to change the transfer of the electric energy from the first capacitive circuit to the electric machine when the electric machine operates as the electric motor, in response to changes of the second direct voltage of the second capacitive circuit with respect to a second direct voltage reference value, to drive the second direct voltage to the second direct voltage reference value, and
      keep the changes of the first direct voltage, with respect to the first direct voltage reference value, smaller than the changes of the second direct voltage with respect to the second direct voltage reference value,
   wherein the control system is further configured to:
      drive the electric machine as the electric motor in response to an increase in the power control signal of the combustion engine,
      drive the electric machine as the generator in response to a decrease in the power control signal of the combustion engine.

2. The electric system according to claim 1, wherein the control system is configured to control the converter equipment to reduce the transfer of the electric energy from the electric machine to the first capacitive circuit in response to a situation in which the first direct voltage exceeds a predetermined over-voltage limit.

3. The electric system according to claim 1, wherein the control system is configured to control the converter equipment to reduce the transfer of the electric energy from the first capacitive circuit to the electric machine in response to a situation in which the first direct voltage falls below a predetermined under-voltage limit.

4. The electric system according to claim 1, wherein capacitance of the second capacitive circuit is greater than capacitance of the first capacitive circuit.

5. The electric system according to claim 1, wherein the second capacitive circuit comprises at least one electric double-layer capacitor.

6. The electric system according to claim 1, wherein the motor power is zero when the second direct voltage is less than or equal to a motor limit voltage of the electric machine operating as the motor, the motor limit voltage being an upper allowable limit voltage for the electric machine when operating as the motor, and the motor power is an increasing function of the second direct voltage when the second direct voltage is greater than the motor limit voltage,
   wherein the generator power is zero when the second direct voltage is greater than or equal to a generator limit voltage of the electric machine operating as the generator, the generator limit voltage being an upper allowable limit voltage for the electric machine when operating as the generator, and the generator power is an increasing function of the second direct voltage when the second direct voltage is less than the generator limit voltage, and
   the generator limit voltage is greater than the motor limit voltage.

7. An electromechanical power transmission chain comprising:
   an electric machine configured to receive mechanical power from a combustion engine and to supply mechanical power to one or more actuators; and
   an electric system configured to supply electrical power to the electric machine when the electric machine operates as an electric motor and to receive electrical power from the electric machine when the electric machine operates as a generator, the electric system comprising:
      a first capacitive circuit comprising at least one first capacitor,
      converter equipment configured to transfer electric energy between the first capacitive circuit and the electric machine, the converter equipment being configured to convert a first direct voltage of the first capacitive circuit into an output voltage and to output the output voltage to the electric machine,
      a second capacitive circuit comprising at least one second capacitor,
      a direct voltage converter configured to transfer electric energy between the first and the second capacitive circuits, and a control system configured to
   determine a torque reference used to drive the electric machine, with the converter equipment, as either the electric motor or the generator, the torque reference being determined at least partly based on:
      a second direct voltage of the second capacitive circuit,
      a power control signal of a combustion engine mechanically connected to the electric machine, the power control signal being used to determine a fuel and air supply of the combustion engine, and
      a rotational speed of the electric machine,
   wherein the torque reference is equal to a motor power for the electric machine divided by the rotational speed when the electric machine operates as the electric motor or is equal to a generator power for the electric machine divided by the rotational speed when the electric machine operates as the generator,
   control the direct voltage converter to transfer the electric energy between the first and the second capacitive circuits, in response to changes of the first direct voltage with respect to a first direct voltage reference value, to drive the first direct voltage to the first direct voltage reference value,
   control the converter equipment to change a transfer of the electric energy from the electric machine to the first capacitive circuit when the electric machine operates as the generator and to change a transfer of the electric energy from the first capacitive circuit to the electric machine when the electric machine operates as the electric motor, in response to changes of the second direct voltage of the second capacitive circuit with respect to a second direct voltage reference value, to drive the second direct voltage to the second direct voltage reference value,
   keep the changes of the first direct voltage, with respect to the first direct voltage reference value, smaller than the changes of the second direct voltage with respect to the second direct voltage reference value,
wherein the converter equipment comprises a converter stage configured to transfer the electric energy from the electric machine to the first capacitive circuit when the electric machine operates as the generator, and configured to transfer the electric energy from the first capacitive circuit to the electric machine when the electric machine operates as the electric motor, and
wherein the control system is further configured to:
   drive the electric machine as the electric motor in response to an increase in the power control signal of the combustion engine, and
   drive the electric machine as the generator in response to a decrease in the power control signal of the combustion engine.

8. The electromechanical power transmission chain according to claim 7, wherein the motor power is zero when the second direct voltage is less than or equal to a motor limit voltage of the electric machine operating as the motor, the motor limit voltage being an upper allowable limit voltage for the electric machine when operating as the motor, and the motor power is an increasing function of the second direct voltage when the second direct voltage is greater than the motor limit voltage, wherein the generator power is zero when the second direct voltage is greater than or equal to a generator limit voltage of the electric machine operating as the generator, the generator limit voltage being an upper allowable limit voltage for the electric machine when operating as the generator, and the generator power is an increasing function of the second direct voltage when the second direct voltage is less than the generator limit voltage, and
the generator limit voltage is greater than the motor limit voltage.

9. A method for controlling an electromechanical power transmission chain that includes:
   a first capacitive circuit including at least one first capacitor,
   an electric machine,
   converter equipment configured to transfer electric energy between the first capacitive circuit and the electric machine,
   a second capacitive circuit including at least one second capacitor, and
   a direct voltage converter,
   the electromechanical power transmission chain being a parallel transmission chain in which the electric machine is mechanically connected to a combustion engine and to one or more actuators,
   the converter equipment including a converter stage configured to transfer electric energy from the electric machine to the first capacitive circuit when the electric machine operates as a generator, and configured to transfer electric energy from the first capacitive circuit to the electric machine when the electric machine operates as an electric motor, the converter equipment converting a first direct voltage of the first capacitive circuit into an output voltage and outputting the output voltage to the electric machine, the method comprising:
   determining a torque reference used to drive the electric machine, with the converter equipment, as either the electric motor or the generator, the torque reference being determined at least partly based on:
      a second direct voltage of the second capacitive circuit,
      a power control signal of a combustion engine mechanically connected to the electric machine, the power control signal being used to determine a fuel and air supply of the combustion engine, and
      a rotational speed of the electric machine,
      wherein the torque reference is equal to a motor power for the electric machine divided by the rotational speed when the electric machine operates as the electric motor or is equal to a generator power for the electric machine divided by the rotational speed when the electric machine operates as the generator;
   controlling the direct voltage converter to transfer electric energy between the first capacitive circuit and the second capacitive circuit, in response to changes of the first direct voltage with respect to a first direct voltage reference value, to drive the first direct voltage to the first direct voltage reference value;
   controlling the converter equipment to change the transfer of the electric energy from the electric machine to the first capacitive circuit when the electric machine operates as the generator and to change the transfer of the electric energy from the first capacitive circuit to the electric machine when the electric machine operates as the electric motor, in response to changes of the second direct voltage of the second capacitive circuit with respect to a second direct voltage reference value, to drive the second direct voltage to the second direct voltage reference value;

driving the electric machine to operate as the electric motor in response to an increase in the power control signal of the combustion engine; and driving the electric machine to operate as the generator in response to a decrease in the power control signal of the combustion engine, wherein the controlling the direct voltage converter and the controlling the converter equipment comprises controlling the changes of the first direct voltage, with respect to the first direct voltage reference value, to be smaller than the changes of the second direct voltage with respect to the second direct voltage reference value.

10. The method according to claim 9, wherein the motor power is zero when the second direct voltage is less than or equal to a motor limit voltage of the electric machine operating as the motor, the motor limit voltage being an upper allowable limit voltage for the electric machine when operating as the motor, and the motor power is an increasing function of the second direct voltage when the second direct voltage is greater than the motor limit voltage, wherein the generator power is zero when the second direct voltage is greater than or equal to a generator limit voltage of the electric machine operating as the generator, the generator limit voltage being an upper allowable limit voltage for the electric machine when operating as the generator, and the generator power is an increasing function of the second direct voltage when the second direct voltage is less than the generator limit voltage, and the generator limit voltage is greater than the motor limit voltage.

11. A non-transitory computer readable medium encoded with a computer program configured to control an electromechanical power transmission chain, the electromechanical power transmission chain including:

a first capacitive circuit including at least one first capacitor, an electric machine, converter equipment configured to transfer electric energy between the first capacitive circuit and the electric machine, a second capacitive circuit including at least one second capacitor, and a direct voltage converter, the electromechanical power transmission chain being a parallel transmission chain in which the electric machine is mechanically connected to a combustion engine and to one or more actuators, the converter equipment including a converter stage configured to transfer electric energy from the electric machine to the first capacitive circuit when the electric machine operates as a generator, and configured to transfer electric energy from the first capacitive circuit to the electric machine when the electric machine operates as an electric motor, the converter equipment converting a first direct voltage of the first capacitive circuit into an output voltage and outputting the output voltage to the electric machine, the computer program comprising computer executable instructions for controlling a programmable processor to:

determine a torque reference used to drive the electric machine, with the converter equipment, as either the electric motor or the generator, the torque reference being determined at least partly based on:

a second direct voltage of the second capacitive circuit, a power control signal of a combustion engine mechanically connected to the electric machine, the power control signal being used to determine a fuel and air supply of the combustion engine, and a rotational speed of the electric machine, wherein the torque reference is equal to a motor power for the electric machine divided by the rotational speed when the electric machine operates as the electric motor or is equal to a generator power for the electric machine divided by the rotational speed when the electric machine operates as the generator;

control the direct voltage converter to transfer electric energy between the first capacitive circuit and the second capacitive circuit, in response to changes of the first direct voltage with respect to a first direct voltage reference value, to drive the first direct voltage to the first direct voltage reference value;

control the converter equipment to change the transfer of the electric energy from the electric machine to the first capacitive circuit when the electric machine operates as the generator and to change the transfer of the electric energy from the first capacitive circuit to the electric machine when the electric machine operates as the electric motor, in response to changes of the second direct voltage of the second capacitive circuit with respect to a second direct voltage reference value, to drive the second direct voltage to the second direct voltage reference value;

drive the electric machine to operate as the electric motor in response to an increase in the power control signal of the combustion engine; and drive the electric machine to operate as the generator in response to a decrease in the power control signal of the combustion engine, wherein the computer executable instructions are further configured to control the programmable processor to control the changes of the first direct voltage, with respect to the first direct voltage reference value, to be smaller than the changes of the second direct voltage with respect to the second direct voltage reference value.

12. The non-transitory computer readable medium according to claim 11, wherein the motor power is zero when the second direct voltage is less than or equal to a motor limit voltage of the electric machine operating as the motor, the motor limit voltage being an upper allowable limit voltage for the electric machine when operating as the motor, and the motor power is an increasing function of the second direct voltage when the second direct voltage is greater than the motor limit voltage, wherein the generator power is zero when the second direct voltage is greater than or equal to a generator limit voltage of the electric machine operating as the generator, the generator limit voltage being an upper allowable limit voltage for the electric machine when operating as the generator, and the generator power is an increasing function of the second direct voltage when the second direct voltage is less than the generator limit voltage, and the generator limit voltage is greater than the motor limit voltage.

* * * * *